United States Patent [19]
Yen

[11] Patent Number: 5,441,037
[45] Date of Patent: Aug. 15, 1995

[54] MULTIPURPOSE GAS LIGHT

[75] Inventor: Cheng-Feng Yen, Chung-Ho, Taiwan

[73] Assignee: Ruey Bor Enterprise Co., Ltd., Taipei Hsien, Taiwan

[21] Appl. No.: 369,889

[22] Filed: Jan. 9, 1995

[51] Int. Cl.[6] .............................................. F24C 5/20
[52] U.S. Cl. ..................................... 126/258; 126/38; 126/260; 362/179
[58] Field of Search ............... 126/258, 255, 260, 256, 126/52, 38, 47; 362/157, 159, 160, 179, 180; 431/111, 344

[56] References Cited

U.S. PATENT DOCUMENTS

| | | | |
|---|---|---|---|
| 3,154,065 | 10/1964 | Bencoe | 126/260 |
| 4,089,635 | 5/1978 | Sivignon | 362/179 |
| 4,646,213 | 2/1987 | Fanelli et al. | 126/47 |
| 4,702,690 | 10/1987 | Sommers et al. | 126/255 |
| 5,016,611 | 5/1991 | Lai | 126/52 |

Primary Examiner—James C. Yeung
Attorney, Agent, or Firm—Alfred Lei

[57] ABSTRACT

A multipurpose gas light including a bracket mounted on the gas can to hold a glass shield around the lamp head and an annular supporting member above the lamp head, a heat shield for covering on the annular supporting member to shield the heat, a container for mounting on the annular supporting member for cooking food after the removable of the heat shield, a container cover for covering the container, and a container cover holder fastened to the gas can at the top for holding the container cover at any of a series of tilted positions to reflect the light of the lamp head in the desired direction by its inside reflecting surface.

1 Claim, 6 Drawing Sheets

MULTIPURPOSE GAS LIGHT

BACKGROUND OF THE INVENTION

A regular gas light is generally comprised of a gas can, a lamp head mounted on the gas can at the top, a gas control lever controlled to release fuel gas from the gas can, and an igniter controlled by a control switch to ignite fuel gas in the lamp head. This structure of gas light is specifically designed to burn fuel gas in the lamp head for illumination, however it cannot be adjusted to focus the light onto a specific spot.

SUMMARY OF THE INVENTION

It is one object of the present invention to provide a multipurpose gas light which can be used as a gas burner, a regular gas light, as well as a spot light. It is another object of the present invention to provide a multipurpose gas light which is simple in structure and easy to assemble.

According to the preferred embodiment of the present invention, the multipurpose gas light comprises a gas can, a lamp head fastened to the gas can at the top, a bracket mounted on the gas can to hold a glass shield around the lamp head and an annular supporting member above the lamp head, a heat shield for covering on the annular supporting member to shield the heat, a container for mounting on the annular supporting member for cooking food after the removable of the heat shield, a container cover for covering the container, and a container cover holder fastened to the gas can at the top for holding the container cover at any of a series of tilted positions to reflect the light of the lamp head in the desired direction by its inside reflecting surface.

Other objects and merits and a fuller understanding of the present invention will be obtained by those having ordinary skill in the art when the following detailed description of the preferred embodiment is read in conjunction with the accompanying drawings wherein like numerals refer to like or similar parts.

BRIEF DESCRIPTION OF THE DRAWINGS

FIG. 2A is an enlarged fragmentary view of FIG. 2;

FIG. 2B is another enlarged fragmentary view of FIG. 2;

DETAILED DESCRIPTION OF THE PREFERRED EMBODIMENT

Figure 1:
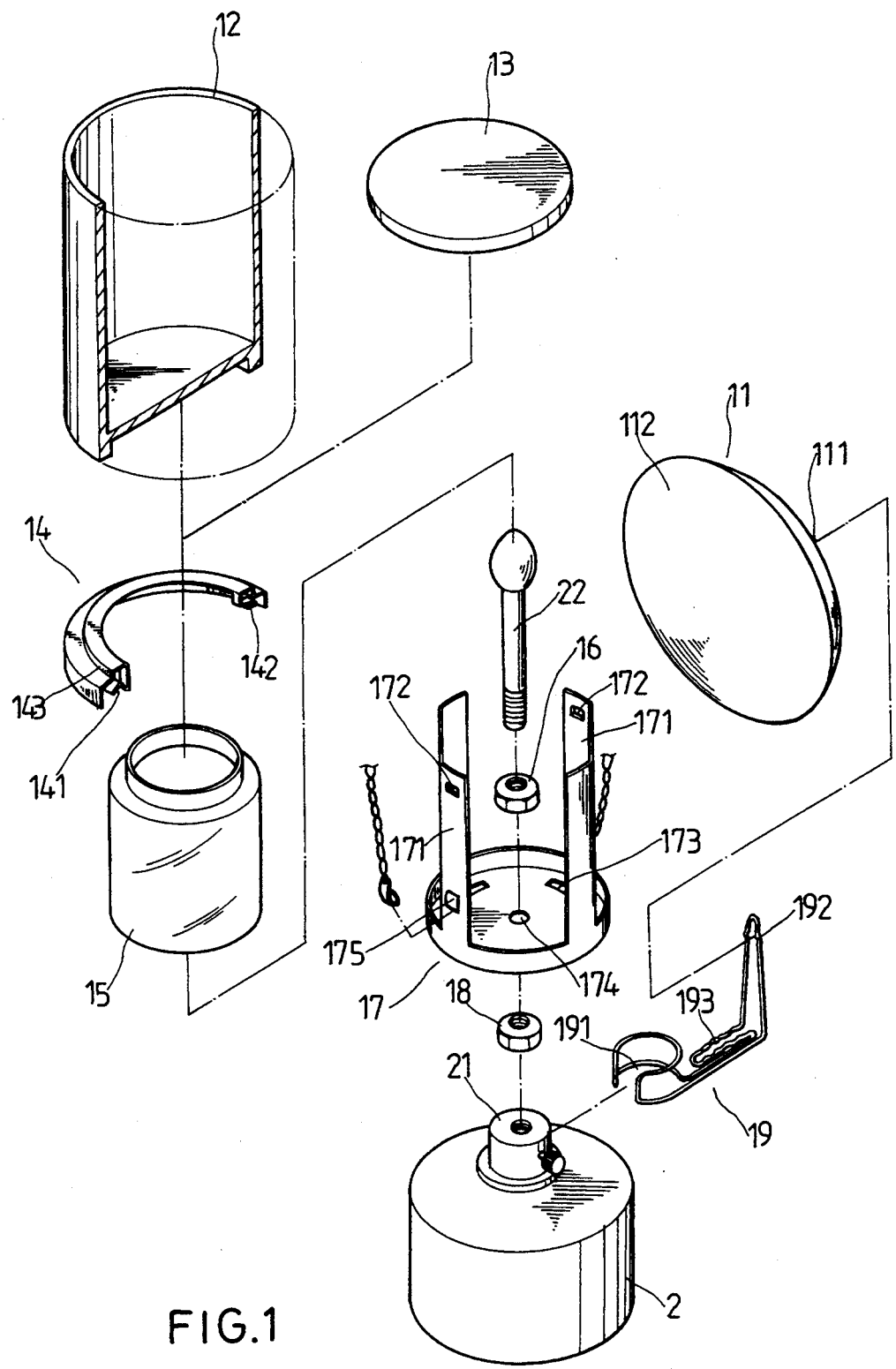
FIG. 1 is an exploded view of a multipurpose gas light according to the present invention.
Figure 2:
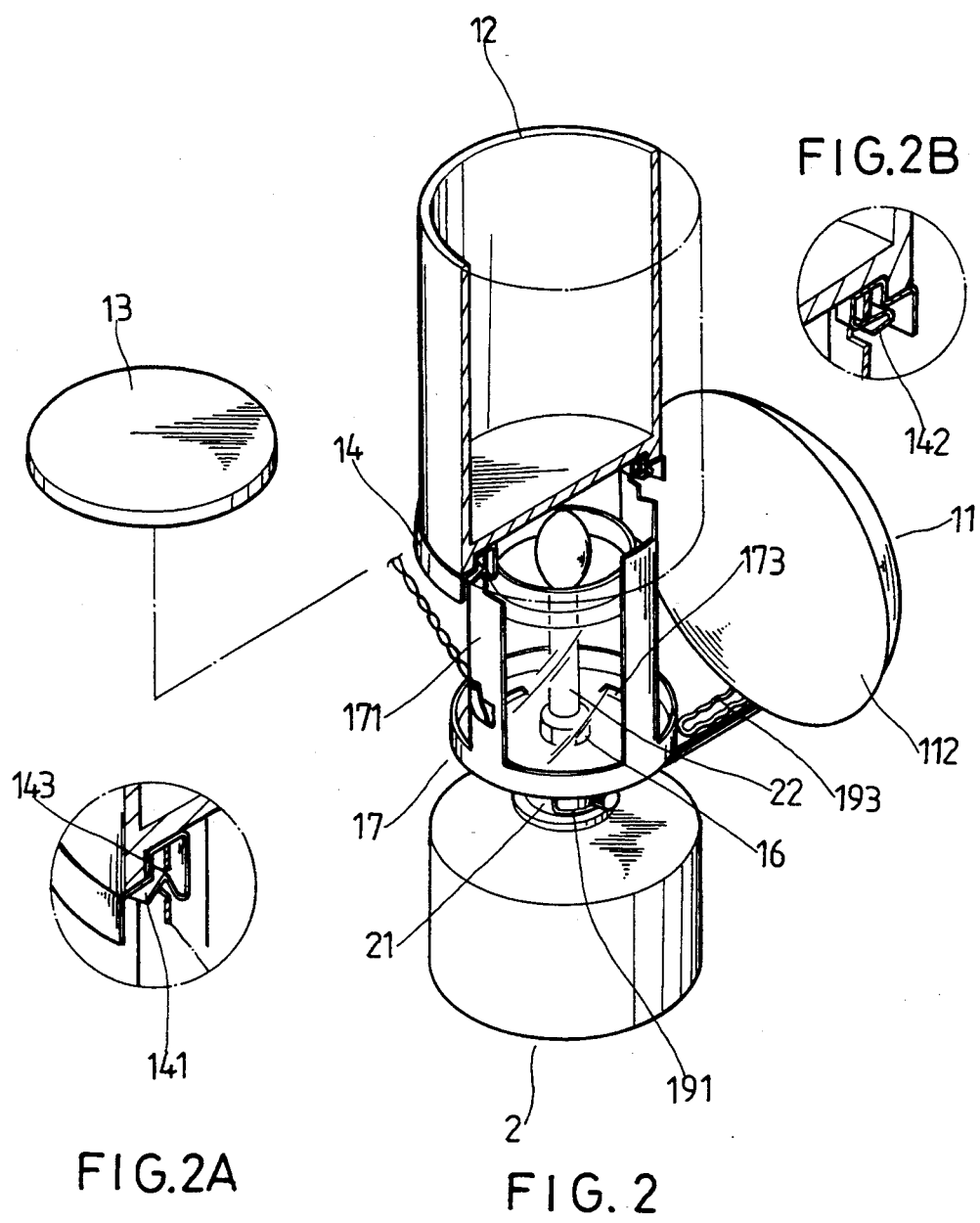
FIG. 2 is a perspective assembly view of the multipurpose gas light shown in FIG. 1.
Figure 3:
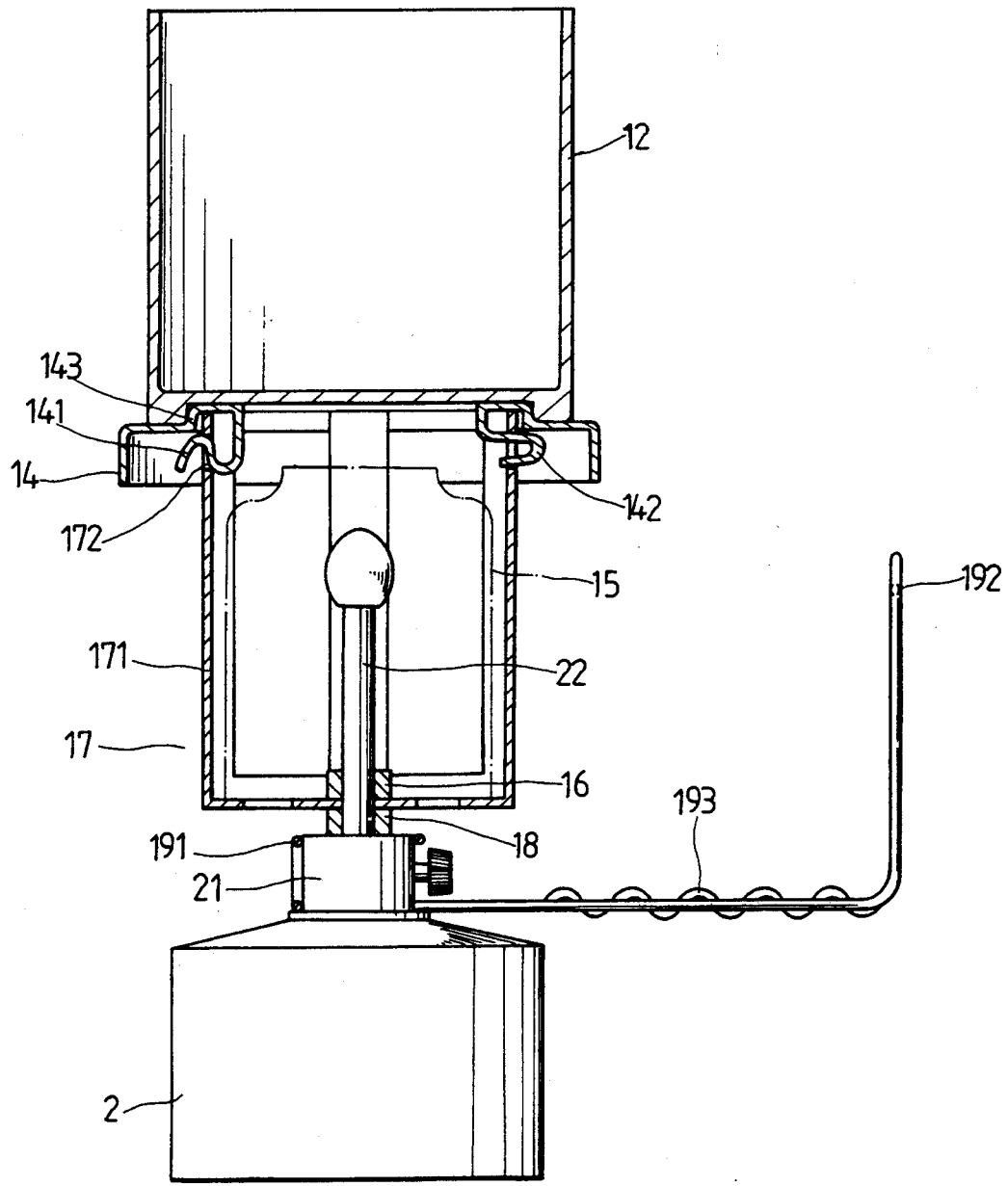
FIG. 3 is a longitudinal view in section of the multipurpose gas light shown in FIG. 2.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alternations and further modifications in the illustrated device, and such further applications of the principles of the invention as illustrated herein being contemplated as would normally occur to one skilled in the art to which the invention relates.

As shown in FIGS. 1, 2, 2A, 2B and 3, a multipurpose gas light in accordance with the present invention is generally comprised of a gas can 2, a lamp head 22, a container cover 11, a container 12, a heat shield 13, an annular supporting member 14, a glass shield 15, two nuts 16 and 18, a bracket 17, and a container cover holder 19. The gas can 2 has a top coupling portion 21. The lamp head 22 is fastened to the top coupling portion 21 of the gas can 2. The bracket 17 is mounted around the lamp head 22 and secured in position by the nuts 16 and 18, having a center through hole 174, through which the lamp head 22 passes, a plurality of air vents 173 spaced around the center through hole 174, and two upright supporting rods 171 for supporting the annular supporting member 14. The upright supporting rods 171 each has a top retaining hole 172 for mounting the annular supporting member 14, and a bottom hooked portion 175 for hanging a hand carrying chain or the like. The annular supporting member 14 is supported on the upright supporting rods 171 of the bracket 17, having a top annular groove 143 for mounting the container 12, a bottom hook 141 and a bottom spring strip 142 respectively fastened to the retaining holes 172 on the upright supporting rods 171. The glass shield 15 is mounted on the bracket 17 and retained between the upright supporting rods 171 around the lamp head 22. The container 12 is mounted on the top annular groove 143 of the annular supporting member 14. The heat shield 13 is retained between the container 12 and the annular supporting member 14. When the container 12 is used for cooking food, the heat shield 13 must be removed from the annular supporting member 14. The container cover 11 has a top knob 111 for the holding of the hand, and an inside reflecting surface 112 for reflecting light. There is also provided a control mechanism (not shown) controlled to release fuel gas from the gas can 2 into the lamp head 22 and to burn the released flow of fuel gas in the lamp head 22.

Figure 4:
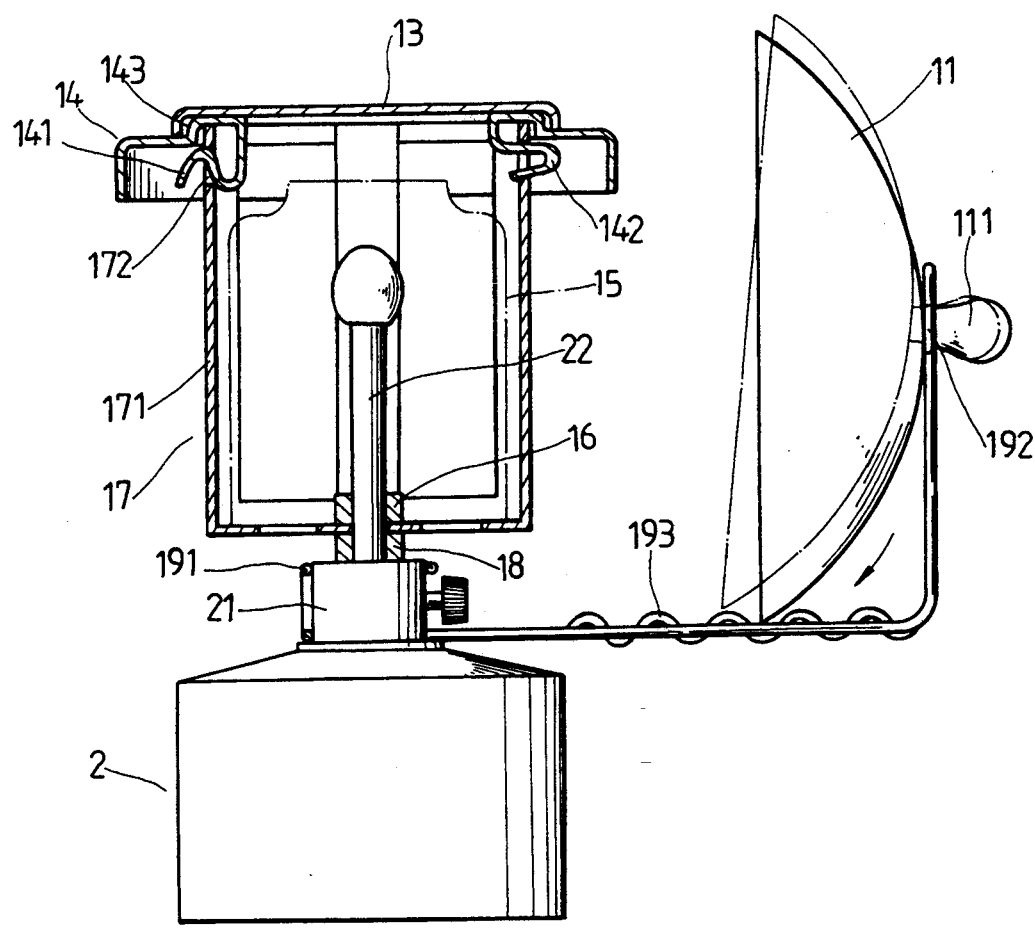
FIG. 4 is similar to FIG. 3 but showing the container removed from the annular supporting member and the container cover fastened to the container cover holder.
Figure 5:
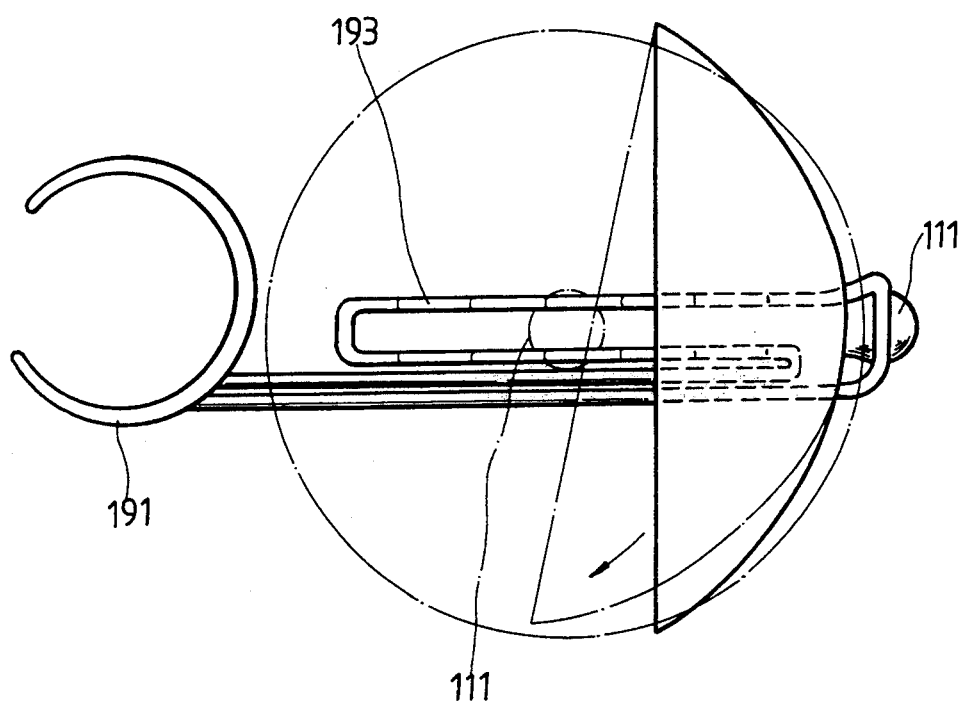
FIG. 5 is a schematic drawing showing the container cover adjusted on the container cover holder.

Referring to FIGS. 4 and 5, the container cover holder 19 comprises a clamping portion 191 horizontally disposed at one end and fastened to the top coupling portion 21 of the gas can 2, a retainer portion 192 vertically disposed at an opposite end for holding down the knob 111 of the container cover 11, and a corrugated supporting portion 193 horizontally disposed between the clamping portion 191 and the retainer portion 192 for supporting the container cover 11 in any of a series of tilted positions. When the container 12 is not used, the container cover 11 can be fastened to the container cover holder 19 and adjusted to the desired tilted position with the reflecting surface 112 facing the lamp head 22 to reflect light in the desired direction.

Figure 6:
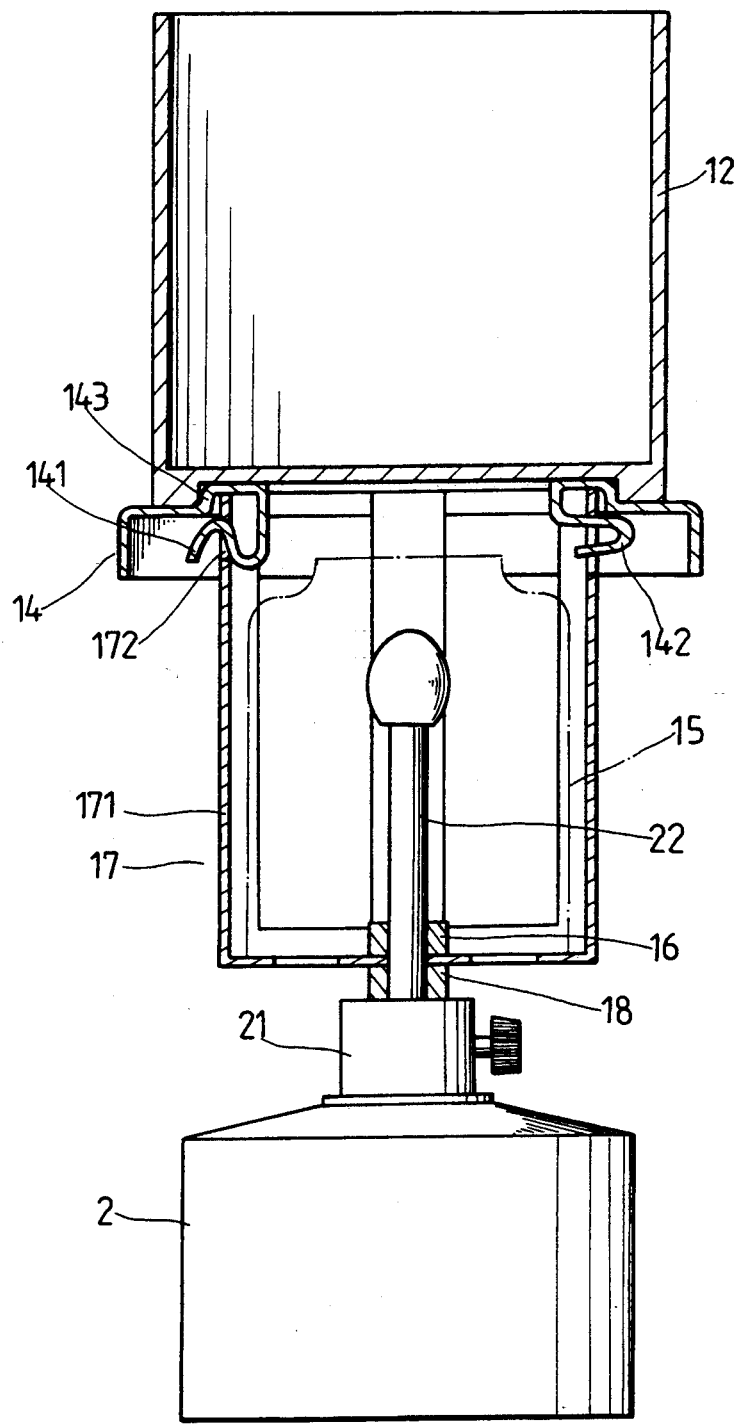
FIG. 6 shows the multipurpose gas light of the present invention used as a gas burner for cooking.

Referring to FIG. 6, when the container 12 is mounted on the top annular groove 143 of the annular supporting member 14, food or water can be put in the container 12 for cooking.

Referring to FIG. 4, when the container 12 is removed from the annular supporting member 14, the heat shield 13 is mounted on the annular supporting member 14 to shield the heat of the lamp head 22. Therefore, when the multipurpose gas light is carried by hand through the hand carrying chain or the like, the heat of the lamp head 22 is shielded from being transmitted to the carrier's hand.

While only one embodiment of the present invention has been shown and described, it will be understood that various modifications and changes could be made without departing from the spirit and scope of the invention.

The invention is naturally not limited in any sense to the particular features specified in the forgoing or to the details of the particular embodiment which has been chosen in order to illustrate the invention. Consideration can be given to all kinds of variants of the particular embodiment which has been described by way of example and of its constituent elements without thereby departing from the scope of the invention. This invention accordingly includes all the means constituting technical equivalents of the means described as well as their combinations.

I claim:

1. A multipurpose gas light of the type comprising a gas can having a top coupling portion and a lamp bulb fastened to said top coupling portion, and a control mechanism controlled to release fuel gas from said gas can into said lamp head and to burn the released flow of fuel gas in said lamp head, the improvement comprising:
   a bracket mounted around said lamp head and secured to said top coupling portion of said gas can by nuts, said bracket comprising a center through hole, through which said lamp head passes, a plurality of air vents spaced around said center through hole, and two upright supporting rods, each upright supporting rod having a top retaining hole and a bottom hooked portion;
   a hand carrying means fastened to the bottom hooked portions of said bracket for carrying by hand;
   an annular supporting member supported on said upright supporting rods of said bracket, having a top annular groove, a bottom hook and a bottom spring strip respectively fastened to the top retaining holes on said upright supporting rods of said bracket;
   a glass shield mounted on said bracket and retained between said upright supporting rods around said lamp head;
   a container for supporting on said annular supporting member for cooking food, said container having an annular bottom flange for fitted into the top annular groove of said annular supporting member;
   a heat shield for mounting on said annular supporting member to shield heat from said lamp head;
   a container cover for covering on said container, said container cover having a top knob for the holding of the hand, and an inside reflecting surface for reflecting light; and
   a container cover holder having a clamping portion horizontally disposed at one end and fastened to said top coupling portion of said gas can, a retainer portion vertically disposed at an opposite end for holding down said top knob of said container cover, and a corrugated supporting portion horizontally disposed between said clamping portion and said retainer portion for supporting said container cover in any of a series of tilted positions.

* * * * *